United States Patent
Lv et al.

(10) Patent No.: US 8,429,087 B2
(45) Date of Patent: Apr. 23, 2013

(54) SYSTEM AND METHOD OF OPTIMAL TIME FOR PRODUCT LAUNCH AN WITHDRAW IN E-COMMERCE

(75) Inventors: Kaili Lv, Hangzhou (CN); Zheng Zhang, Hangzhou (CN); Jie Su, Hangzhou (CN); Zengguang Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 12/993,139

(22) PCT Filed: Sep. 9, 2010

(86) PCT No.: PCT/US2010/048281
§ 371 (c)(1),
(2), (4) Date: Nov. 17, 2010

(87) PCT Pub. No.: WO2011/031867
PCT Pub. Date: Mar. 17, 2011

(65) Prior Publication Data
US 2012/0166315 A1    Jun. 28, 2012

(30) Foreign Application Priority Data
Sep. 11, 2009 (CN) .......................... 2009 1 0176254

(51) Int. Cl.
*G06Q 10/00* (2006.01)
(52) U.S. Cl.
USPC .......... 705/300; 705/1.1; 705/26.1; 705/27.1; 705/7.31; 705/7.32

(58) Field of Classification Search ................. 705/26.1, 705/27.1, 28, 7.31, 7.32, 300, 1.1
See application file for complete search history.

(56) References Cited

U.S. PATENT DOCUMENTS

| | | | |
|---|---|---|---|
| 6,243,691 B1 * | 6/2001 | Fisher et al. .................... | 705/37 |
| 7,240,027 B2 | 7/2007 | McConnell et al. | |
| 7,295,995 B1 | 11/2007 | York et al. | |
| 7,774,294 B2 | 8/2010 | Aravamudan et al. | |
| 7,779,014 B2 | 8/2010 | York et al. | |
| 2002/0082977 A1 * | 6/2002 | Hammond et al. ............. | 705/37 |
| 2003/0046141 A1 * | 3/2003 | Kamal ........................... | 705/10 |
| 2003/0177069 A1 | 9/2003 | Joseph | |
| 2005/0197928 A1 | 9/2005 | Fotteler et al. | |
| 2005/0216371 A1 | 9/2005 | Fotteler et al. | |
| 2006/0111963 A1 * | 5/2006 | Li et al. ......................... | 705/10 |
| 2007/0100680 A1 | 5/2007 | Kumar et al. | |
| 2007/0282693 A1 * | 12/2007 | Staib et al. ..................... | 705/26 |

(Continued)

*Primary Examiner* — Yogesh C Garg
(74) *Attorney, Agent, or Firm* — Lee & Hayes, PLLC

(57) ABSTRACT

The present disclosure introduces a technique for achieving the optimal time to launch or withdraw products on a webpage. In one aspect, a method includes: storing information to be collected from a webpage for one or more items corresponding to a first product; collecting data related to the one or more items in each time section of a plurality of time sections; calculating a respective value score for each time section of the plurality of time sections based on a respective number of occurrences of the one or more items in each time section; determining the optimal time to launch or withdraw the first product based on value scores of the first product for the plurality of time sections; and rendering launch or withdrawal of the first product on the webpage in the optimal time. Implementation of the technique will conveniently allow a merchant's product website to automatically complete a product launch or withdrawal in the optimal time.

20 Claims, 4 Drawing Sheets

U.S. PATENT DOCUMENTS

2008/0306820 A1    12/2008  Passmore
2009/0006184 A1*    1/2009  Leach et al. .................... 705/10
2009/0048862 A1*    2/2009  Cardno et al. ................... 705/1
2009/0138472 A1     5/2009  MacLean
2010/0049644 A1     2/2010  Feldman et al.
2010/0070514 A1*    3/2010  Woodruff ..................... 707/754

* cited by examiner

SYSTEM AND METHOD OF OPTIMAL TIME FOR PRODUCT LAUNCH AN WITHDRAW IN E-COMMERCE

CROSS REFERENCE TO RELATED PATENT APPLICATIONS

This application is a national stage application of an international patent application PCT/US2010/048281, filed Sep. 9, 2010, which claims priority from Chinese Patent Application No. 200910176254.8, filed Sep. 11, 2009, and entitled "SYSTEM AND METHOD OF OPTIMAL TIME FOR PRODUCT LAUNCH AND DELAUNCH IN E-COMMERCE", which applications are hereby incorporated in their entirety by reference.

TECHNICAL FIELD

The present disclosure relates to the field of Internet technology and, more specifically, to an electronic commerce, or e-commerce, system and method for achieving the optimal time to launch or withdraw products.

BACKGROUND OF THE PRESENT DISCLOSURE

With the advancement of modern information technology, web-based transactions are finding favor and getting more attention from people. Web-based transactions are not subject to territorial limitations (especially remote suburbs and counties) and are not limited by office hours. As long as the requirements for secure online transactions are in place, anyone can easily and conveniently order online from home or from the office.

FIG. 1 is a schematic diagram of the fundamental structure of a commonly seen e-commerce system, which consists of client terminal 11, merchant terminal 12, and e-commerce platform 13. Client terminal 11, merchant terminal 12 and electronic commerce (hereinafter "e-commerce") platform 13 are connected to each other through the Internet. Merchant terminal 12 creates a corresponding merchant name in the e-commerce platform 13, and displays the merchant's products through the e-commerce platform 13. Usually, all the products of a given merchant (also called the merchant's virtual store products) are set-up in linked web pages. The virtual store information of different merchants are set up in each e-commerce platform 13, even the information of other e-commerce platforms are set up, and through the e-commerce platform 13, product information of other merchants are displayed. Client terminal 11 logs into e-commerce platform 13 through the Internet, and selects the desired products to buy from the merchant virtual stores. The settlement of goods payments between client terminal 11 and merchant terminal 12 can be done through third-party payment platforms, express delivery companies, or banks or other financial institutions with financial systems for settling goods payments. What needs to be emphasized is that there are no strict boundaries between merchant terminal 12 and client terminal 11, because many merchants are also buyers. Therefore, the merchant terminal 12 and client terminal 11 mentioned in this present disclosure are separated for the purpose of explaining the application's proposed techniques, and not to restrict all product providers as merchant terminal 12 or all buyers as client terminal 11.

The e-commerce platform 13 mainly includes server 131 and database 132. Database 132 is used mainly to store merchant information, including the merchant name, product information, client information and product transaction information. Server 131 mainly consists of an interface display processing unit, an interactive processing unit and a transaction processing unit. The interface display processing unit is used to display product information. The interactive processing unit is used to process the interaction between the merchant and the client. The transaction processing unit is used to process the transaction.

The merchants that sign contracts with e-commerce platform 13 are big companies. Each merchant supplies numerous products, and there is a level of difficulty for the interface display processing unit to display the merchants' products. A commonly used method of the interface display processing unit to control product display is discussed below.

First, each merchant is provided with the webpage address that displays their product information. Next, rules for displaying the products are established. The display rules can stipulate that the products of a merchant should not be in the 'launch' state from start to finish. Product launch refers to the product information appearing in the e-commerce platform 13, which provides the information to the merchant's webpage and all its subpage systems, where said subpage systems refers to the merchant's webpage subpages, the subpages' succeeding subpages, etc.

The interface display processing unit will check if the merchant's webpage and its subpages contain products that have reached a predefined maximum launch period (e.g. 7 days). If yes, the product will undergo a withdrawal process. Withdrawal process means that a product's webpage will be disconnected, so that clients will not be able to visit the webpage. As for product launching, the merchant, based on its own experience, should launch a product at the time when there are many visitors and transactions.

Besides product launching and withdrawal, the interface display processing unit controls the merchant's product list. The product information that is nearest the withdrawal time is to be displayed at the top of the list. The interface display processing unit allows the corresponding webpages of the products that are displayed at the top of the product list to be easily visited by the clients.

The current methods of launching or withdrawing products have the following drawbacks:

First, there are no unified rules on product launching. The e-commerce platform has no way to control the launching of products, and it can only use its self-defined rules (e.g., at the start, merchants can launch no more than 10 products) to singularly control whether a product can be launched or not. However, it cannot provide controls targeted at specific products (or product groups). For example, reading glasses for old people are typically better launched in the morning than in the evening, and fashionable items for young people are typically better launched in the evening or afternoon than in the morning. The merchant only decides when to launch products based on the merchant's own experience. This method of launching products is difficult for the merchants, especially if launching numerous products. A merchant can easily miss out on an opportunity for a sale due to inaccurate product launch times.

Next, the interface display processing unit checks the merchant's webpage and its subpages for products that have reached the predefined maximum launch period (e.g., 7 days). These products will undergo the withdrawal process. This method of controlling the withdrawal process also causes technical inconsistencies. For example, a certain product has been sold out, but the merchant forgets to withdraw the product. If the above-mentioned way of processing is allowed to continue, the sold-out product will utilize a huge amount of resources, resulting in wastage.

Lastly, the product information that is nearest the withdrawal time is displayed at the top of the product list. When there are many products being launched, the interface display processing unit needs to utilize a huge amount of time and resources to arrange and display the items in the product list, thus wasting resources and causing a delay in providing information to clients.

SUMMARY OF THE DISCLOSURE

The present disclosure introduces an e-commerce system for achieving the optimal time to launch or withdraw products, and to solve the problem with the current technology that uses up a large amount of the system's resources for launching or withdrawing products and is unable to realistically provide a merchant with product launching or withdrawal time.

Another purpose of the present disclosure is to provide a method for achieving the optimal time to launch or withdraw products, and to solve the problem with the current technology that uses up a large amount of the system's resources for launching or withdrawing products and is unable to realistically provide a merchant with product launching or withdrawal time.

In one aspect, an electronic commerce (e-commerce) system comprises a database and a server communicatively coupled to the database.

The database may comprise a webpage collection and item storage unit that stores information to be collected from a webpage for one or more items corresponding to a first product.

The server may comprise: a webpage information collection processing unit, a time section value score calculation unit, a product launch/withdrawal optimal time determination unit, and a product launch/withdrawal processing unit. The webpage information collection processing unit may gather item related data to be collected by the webpage. The time section value score calculation unit may calculate a respective value score for each of a plurality of time sections. The product launch/withdrawal optimal time determination unit may determine a optimal time to launch or withdraw the first product based on value scores of the first product for the plurality of time sections. The product launch/withdrawal processing unit may render product launch or withdrawal of the first product in the optimal time.

In one embodiment, the server may further comprise a time section determination unit. The time section determination unit may determine if a number of clients who visited the webpage has reached or exceeded a predefined value in a predefined time limit. The time section determination unit may increase the time limit to a new time limit when the number of clients who visited the webpage has not reached or exceeded the predefined value in the predefined time limit until the number of clients who visited the webpage has reached or exceeded the predefined value in the time limit. The time section determination unit may set the new time limit as a duration of the respective time section.

In one embodiment, the server may further comprise a product launch/withdrawal reference processing unit. The product launch/withdrawal reference processing unit may identify a second product that is similar to the first product, determine a launch or withdrawal optimal time corresponding to the second product, and render the product launch or withdrawal of the first product in the optimal time corresponding to the second product.

In one embodiment, the server may further comprise a webpage information collection interactive interface. The webpage information collection interactive interface may accept data from a user to collect information of the one or more items corresponding to the first product.

In one embodiment, the database may further comprise a product optimal time data storage unit. The product optimal time data storage unit may store a respective optimal time for launch or withdrawal of the first product as determined by the product launch/withdrawal optimal time determination unit.

In one embodiment, the time section value score calculation unit may calculate a respective value score for each of the plurality of time sections based on a respective number of occurrences of the one or more items in each time section.

In one embodiment, the information to be collected by the webpage may include: a time of a user's visit to the webpage, information of the user who visited the webpage, and a time of an order placed by the user.

In one embodiment, the time section value score calculation unit may calculate a respective value score for each of the plurality of time sections by using a formula of $\text{sum}(t) = q_1 \ast m_1 + q_2 \ast m_2 + \ldots + q_n \ast m_n$, wherein $q_1, q_2 \ldots q_n$ each represents a respective proportion of respective item data that needs to be gathered by the webpage, $m_1, m_2 \, m_n$ each represents a respective number of occurrences of a respective item in the time section, and $\text{sum}(t)$ represents the value score of the time section. When the formula is in the form of $\text{sum}(t) = q_1 \ast m_1 + q_2 \ast m_2$, $m_1$ is a number of users who have visited the webpage in a time section t, $m_2$ is a number of orders placed in the time section t, $q_1$ is a weight for $m_1$, and $q_2$ is a weight for $m_2$.

In another aspect, a method for achieving product launch or withdraw on a webpage at an optimal time is provided. The method may comprise: storing information to be collected from a webpage for one or more items corresponding to a first product; collecting data related to the one or more items in each time section of a plurality of time sections; calculating a respective value score for each time section of the plurality of time sections based on a respective number of occurrences of the one or more items in each time section; determining the optimal time to launch or withdraw the first product based on value scores of the first product for the plurality of time sections; and rendering launch or withdrawal of the first product on the webpage in the optimal time.

In one embodiment, the method may further comprise: identifying a second product that is similar to the first product; determining a corresponding optimal time for product launch of the second product; and rendering product launch for the first product on the webpage in the corresponding optimal time for product launch of the second product.

In one embodiment, the method may further comprise: providing an interface for a user to enter information to be collected from the webpage for one or more items corresponding to one or more products; storing the information for the one or more items corresponding to one or more products as entered by the user, the information including criteria for calculating value scores and respective weights of each of the one or more items; and calculating the value scores for the plurality of time sections based on the information entered by the user.

In one embodiment, calculating a respective value score for each time section of the plurality of time sections may comprise: calculating a respective value score for each of the plurality of time sections by using a formula of $\text{sum}(t) = q_1 \ast m_1 + \ast m_2 + \ldots + q_n \ast m_n$, wherein $q_1, q_2 \ldots q_n$ each represents a respective proportion of respective item data that needs to be gathered by the webpage, $m_1, m_2 \ldots m_n$ each represents a respective number of occurrences of a respective item in the time section, and sum (t) represents the value score of the time section.

In one embodiment, storing information to be collected from the webpage for the one or more items corresponding to the first product may comprise: determining a lowest time limit and a highest time limit; setting the lowest time limit as a default time limit; assessing whether a number of client visit to the webpage has exceeded a predefined value in the default time limit; increasing the default time limit when the number of client visit to the webpage has not exceeded the predefined value in the default time limit; and setting the default time limit as a duration of the respective time section when the number of client visit to the webpage has exceeded the predefined value in the default time limit.

In one embodiment, determining the optimal time may comprise determining a time section with a highest value score to be the optimal time.

Compared with the current technology, the technique provided in the present disclosure has a number of advantages. First, the present disclosure controls the merchant's products, and automatically completes the product launching or withdrawal, so there is no need for the merchant to control this process, thus avoiding confusion on the merchant's part. The e-commerce platform does not need additional resources to check for mix-ups in the product launching or withdrawal process. Next, the proposed technique focuses on the merchant and provides self-adaptive launching or withdrawal time for the merchant's unique products. It is convenient for the merchant to implement, the calculation method is simple, and the product launching or withdrawal will be automatically completed at the optimal times. Lastly, the present disclosure will trigger the withdrawal process for a product that has been sold-out, so that the product will not use up additional resources. This will result in enhanced resource utilization.

DETAILED DESCRIPTION

Figure 1:
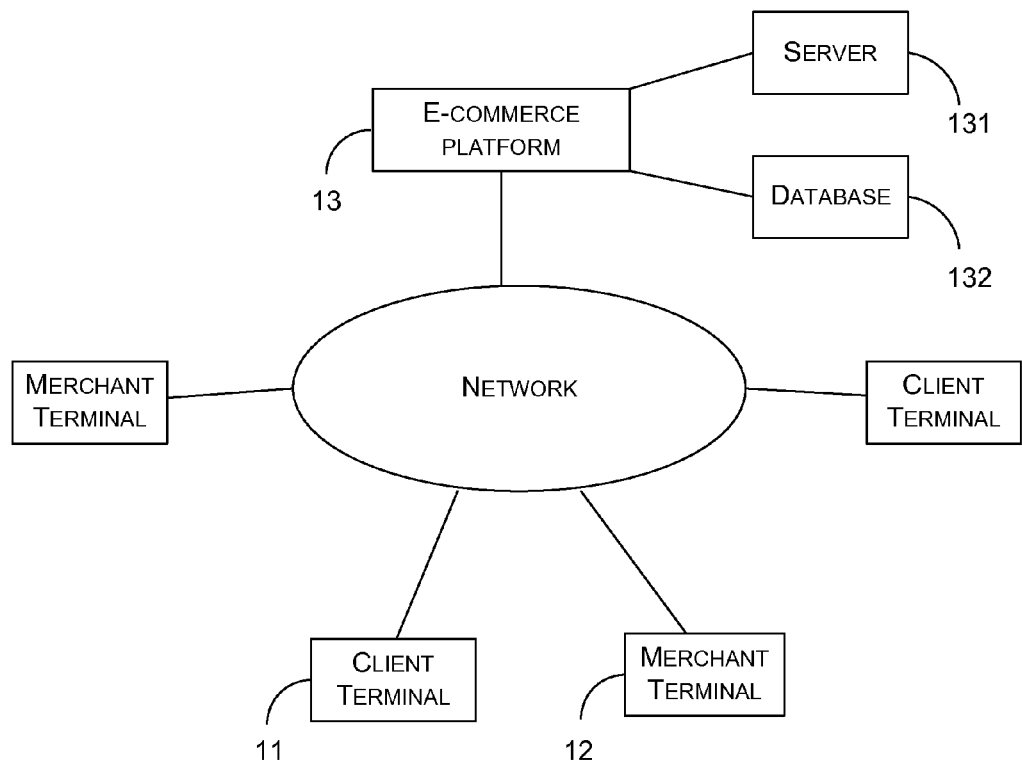
FIG. 1 is a diagram of a conventional e-commerce system.
Figure 2:
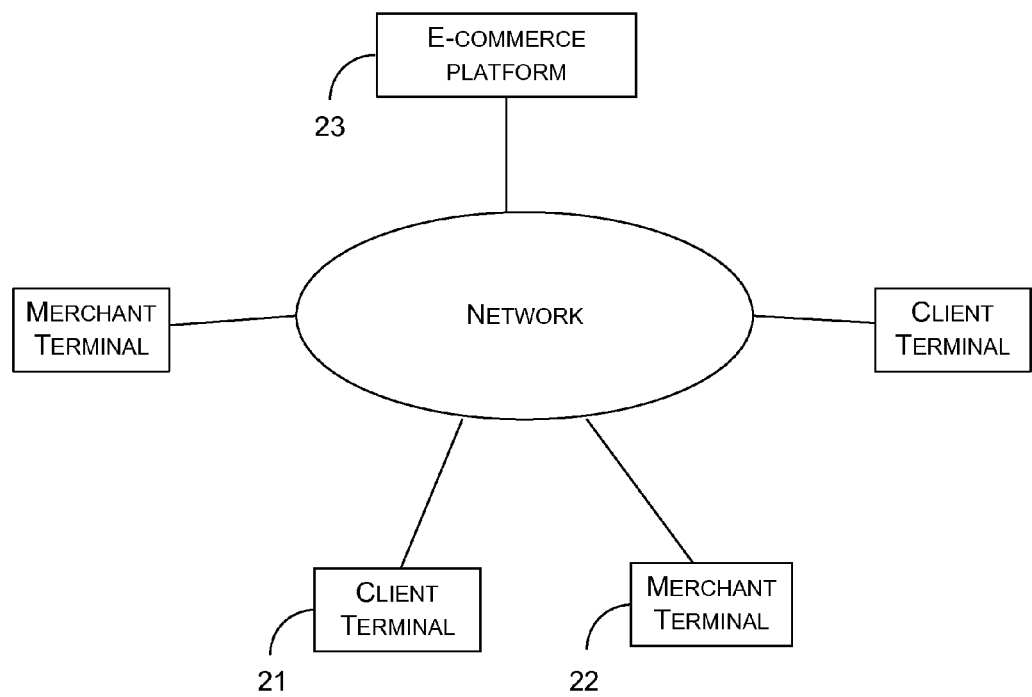
FIG. 2 is a diagram of an e-commerce system in accordance with the present disclosure.

FIG. 2 illustrates an e-commerce system for achieving the optimal time to launch or withdraw products in accordance with the present disclosure. The system comprises the E-Commerce Platform 23, Merchant Terminal 22, and Client Terminal 21. The E-Commerce Platform 23, Merchant Terminal 22, and Client Terminal 21 are communicatively coupled to each other through one or more networks, such as the Internet and wireless communication networks.

Client Terminal 21 and Merchant Terminal 22 can either be network terminals or portable terminals such as mobile phones. Client Terminal 21 and Merchant Terminal 22 can also be nodes in a local area network (LAN). In principle, Client Terminal 21 and Merchant Terminal 22 can log into the E-Commerce Platform 23 through the network.

Figure 3:
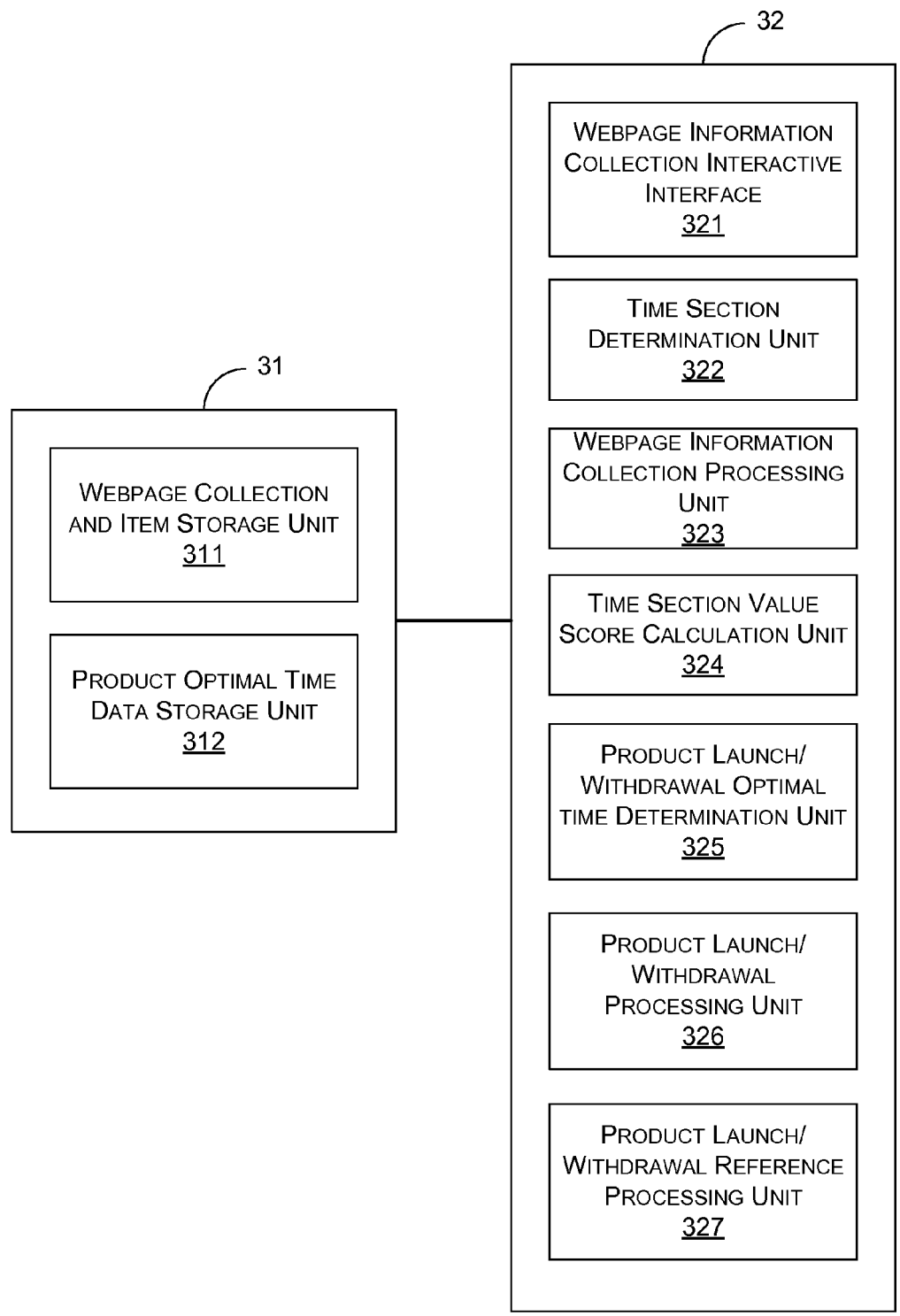
FIG. 3 is a diagram of the fundamental structure of an e-commerce platform in accordance with the present disclosure.

From a logical point of view, the E-Commerce Platform 23 comprises a Database 31 and a Server 32 communicatively coupled to Database 31, as shown in FIG. 3. In one embodiment, Database 31 and Server 32 are both implemented in a single processor-based server. Alternatively, Database 31 is implemented in one or more processor-based servers different from Server 32. In one embodiment, Server 32 is implemented in one or more processor-based servers.

Referring to FIG. 3, Database 31 includes components as described below.

Webpage Collection and Item Storage Unit 311 stores the information to be collected from a webpage for one or more items corresponding to a product. When the system (such as the E-Commerce Platform 23) provides a merchant with software for achieving the optimal time for launching or withdrawing products, the system can initially provide default item information for the product to be collected. For example, the items the information of which is to be collected may include the following: frequency of client visits for each product of the merchant on the webpage, duration of the visit, the time when the client orders and buys a certain product, etc. Aside from the item name, the item information of an item may also include a proportion of the item among all the items the information of which is to be collected. In one embodiment, the information to be collected by the webpage includes: includes: a time of a client's visit to the webpage, information of the client who visited the webpage, and a time of an order placed by the client.

In some embodiments, the Webpage Collection and Item Storage Unit 311 can store the webpage item information for a product that is entered by the merchant. Each merchant can also establish the item information that needs to be collected by each product's corresponding webpages.

Product Optimal Time Data Storage Unit 312 stores the respective optimal time for launching or withdrawing each product. The Product Optimal Time Data Storage Unit 312 can store not only the optimal time for launching a certain product of a certain merchant, but can also save both the optimal time for launching and the optimal time for withdrawing products. Usually, a product's withdrawal typically coincides with another product's launch, thus the embodiment only stores the optimal time for launching a certain product of a certain merchant, which is approximately the same time as the withdrawal of another product. In addition, the time limit for a product's launching and withdrawal can be set. For example, a product's launch date is set for January 1, 3 PM. The withdrawal date can be set for January 8, 3 PM, or be withdrawn once it is sold out even if it has not yet reached the withdrawal due date.

In one embodiment, considerations are made from the perspective of the merchant, by storing the launch optimal time and withdrawal optimal time of all the products of the merchant. If we consider that many merchants have many products, and if we storage the launch optimal time and withdrawal optimal time of all the products, this will increase the required storage space usage. The Product Optimal Time Data Storage Unit 312 can be configured to store only the launch optimal time of the predefined products of the merchant.

In one embodiment, the Server 32 includes:

Webpage Information Collection Interactive Interface 321 accepts data entered by a user, such as a merchant, to collect information related to one or more items corresponding to the product. For example, Webpage Information Collection Interactive Interface 321 provides an interface to a merchant, where the merchant can enter item information for the merchant's products listed on the webpage. The item information collected from the merchant may include name of the item, a proportion of the item among all the items the information of which is to be collected, etc. Considering that the item information provided by each merchant can be varied and different, there may be a level of difficulty in gathering together all the item information, and thus, this sample embodiment enumerates only the items that have been predefined to be collected. In general, this method will be able to provide collected webpage information that can satisfy individual requirements.

Time Section Determination Unit 322 determines if the number of clients who have visited the webpage has reached or exceeded a predefined value in a predefined time limit. The Time Section Determination Unit 322 may increase the time limit if the predefined value has not been reached or exceeded, until it is determined that the number of clients who have visited the webpage has reached or exceeded the predefined value. The corresponding time limit with increased length may be set as the duration of the time section. Aside from determining if the number of clients who have visited the webpage has reached or exceeded the predefined value, the Time Section Determination Unit 322 can also determine if the frequency of visits to the webpage has reached or exceeded a predefined frequency in the predefined time limit. The principle of operation is the same, so detailed description will not be provided in the interest of brevity. The time limit may be within one day or more than one day, but usually is set to be within one day.

Assuming the predefined time limit is 1 hour and the requirement is to have at least 3 client visits to the corresponding product webpage within the time limit of 1 hour, the Time Section Determination Unit 322 can assess if there are 3 clients who have visited the product webpage in the time limit of 1 hour. If the number of visits is at least 3, then the current time limit (1 hour) may be set as the duration of the time section. In other words, the 24 hours of a day can be divided into 24 time sections, each with 1 hour as the duration. On the other hand, if fewer than 3 clients have visited the product webpage within the time limit, then the Time Section Determination Unit 322 may increase the time limit. For example, the Time Section Determination Unit 322 may increase the time limit to 1.5 hours, and then determine again if within the 1.5-hour period there are at least 3 clients who have visited the product webpage. The Time Section Determination Unit 322 may repeat this process until it reaches a new time limit within which there are at least 3 clients who have visited the product webpage. This new time limit may then be set as the duration of the time section.

In one embodiment, the Time Section Determination Unit 322 can use the volume of orders for a product to evaluate the time limit. For example, when the number of orders for a particular product has reached a predefined number of orders within a time limit, such time limit may be set as the duration of the time section. As another example is, if within a time limit the monetary amount of orders for a particular product has reached a predefined amount, then the time limit may be set as the duration of the time section.

In one embodiment, the Time Section Determination Unit 322 may be optional. In such case the system may use a default time section, such as a one-hour time section with 24 time sections in a day, for example.

Webpage Information Collection Processing Unit 323 gathers related item data to be collected by the webpage in each time section. The Webpage Information Collection Processing Unit 323 is usually connected to an existing interface display processing unit, or combined with the interface display processing unit.

To illustrate using the frequency of visits to a certain webpage as an example, after the Webpage Information Collection Processing Unit 323 receives notification that the webpage has been clicked, it will increment the frequency of client visits to the webpage by 1. Clients coming from the same IP address may be considered as one and the same client. After the Webpage Information Collection Processing Unit 323 receives notification that the webpage has been clicked, it will compare the client's IP address with saved IP addresses of clients that have visited the webpage. If there is no matching IP address, the Webpage Information Collection Processing Unit 323 will save the client's IP address, and increment the frequency of client visit to the webpage by 1. However, visitors to a webpage are not necessarily buyers, but can also be merchants as well. Clients and merchants normally will first sign up as members in the E-Commerce Platform 23. When the Webpage Information Collection Processing Unit 323 receives notification that the webpage has been clicked, it will check the information of the member who clicked the webpage, save the member's ID, and increment the frequency of client visit to the webpage by 1. If the client who clicked the webpage has already clicked the webpage in the current time section, another option is not to increment the frequency of client visit to the webpage. The frequency of client visit to a webpage is calculated based on predefined rules.

Time Section Value Score Calculation Unit 324 calculates a respective value score for each time section of a plurality of time sections. This can be done, for example, by using the formula $\text{sum}(t) = q_1 * m_1 + q_2 * m_2 + \ldots q_n * m_n$, where $q_1, q_2, \ldots q_n$ each represents a respective proportion of respective item data that needs to be gathered by the webpage, $m_1, m_2, \ldots m_n$ each represents a respective number of occurrences of a respective item in the time section, and sum (t) represents the value score of the time section.

For example, in $\text{sum}(t) = q_1 * m_1 + q_2 * m_2$, $m_1$ is the number of clients who have visited the homepage in the time section t, $m_2$ is the number of times the clients ordered in the time section t, $q_1$ is the weight for the user's visit to the homepage, and $q_2$ is the weight for the user's order.

Product Launch/Withdrawal Optimal time Determination Unit 325 determines the optimal time to launch or withdraw a product, based on the product's value score for each time section.

In one embodiment, the launch time is the time section with the highest value score.

Product Launch/Withdrawal Processing Unit 326 renders the launch or withdrawal of a product in the optimal time to consummate the product launch or withdrawal.

When the product is to be launched, the Product Launch/Withdrawal Processing Unit 326 can refer to the optimum launch time of a previously launched similar (or same type of) product, and proceed to launch the product in concern during that optimal time. In one embodiment, the product can be launched in the time section with the highest value score, or launched before reaching the time section with the highest value score. After the product has been launched, the optimal time for launching may be calculated and stored in the Product Optimal time Data Storage Unit 312. This will serve as reference for future launch of similar (or same type of) products.

In one embodiment, the Product Launch/Withdrawal Processing Unit 326 can also be used to calculate the transaction volume of a product. For example, once the transaction volume has reached a predefined total for the product, the product may be withdrawn.

In one embodiment, the Server 32 also includes a Product Launch/Withdrawal Reference Processing Unit 327. The Product Launch/Withdrawal Reference Processing Unit 327 finds a product that is similar to the product in concern, identifies a launch or withdrawal optimal time corresponding to the similar product, and renders the product launch or withdrawal of the product in concern in the optimal time corresponding to the similar product.

The above-described units may be logically separate, and may also be physically separate. Usually, they are logically separate. These units are usually implemented using software modules in one or more hardware platform. For example, we can create software for the optimal time for launch or withdrawal of one or more products, and then install the software in a merchant's virtual store. When a product needs to be launched, the software can search for the optimal time to launch the product, and then automatically launch the product in the identified optimal time. When a product needs to be withdrawn, the software can search for the optimal time to withdraw the product, and then automatically withdraw the product in the identified optimal time.

Figure 4:
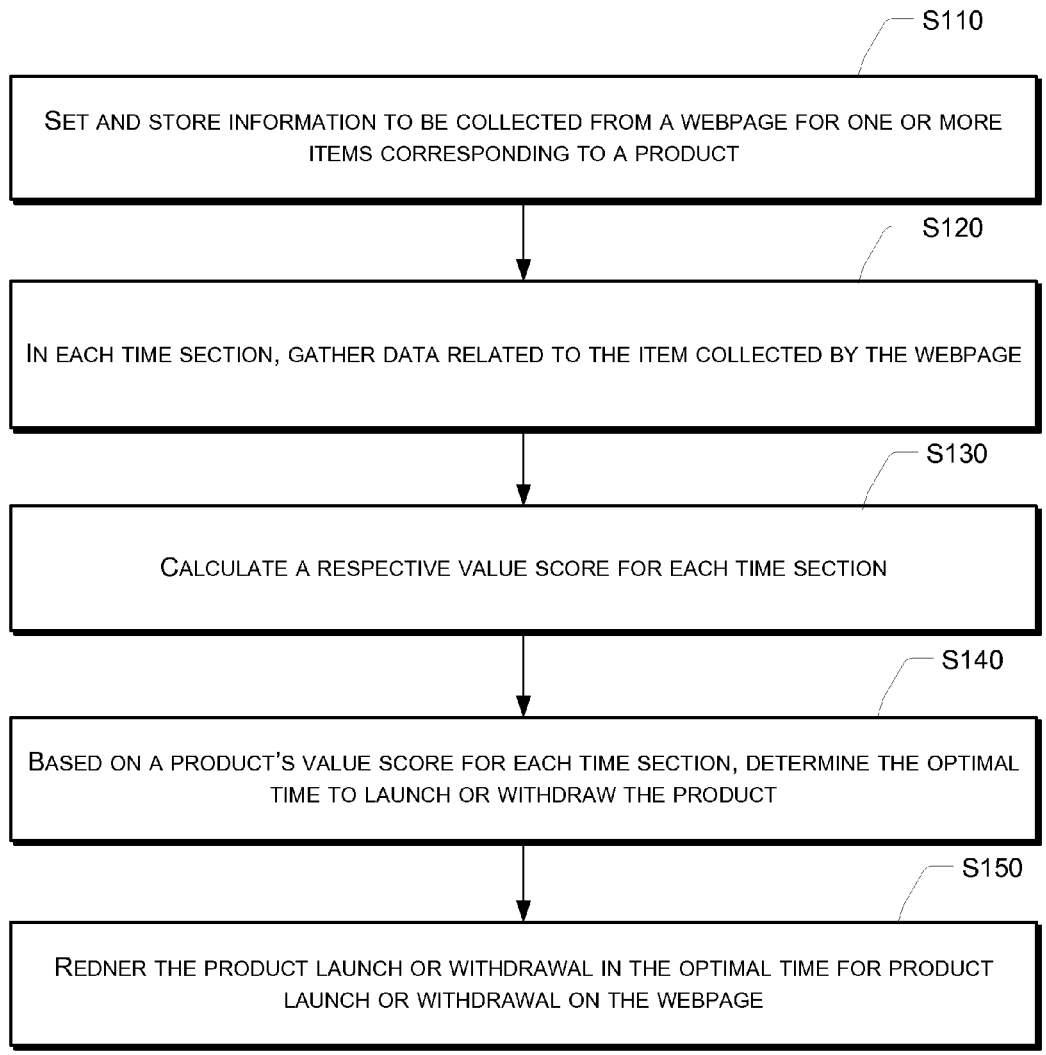
FIG. 4 is a flowchart of a method for achieving the optimal time for product launching or withdrawal in accordance with the present disclosure.

FIG. 4 illustrates a flow diagram for a method, or process, of achieving the optimal time for launching or withdrawing a product, as mentioned in this present disclosure. The process includes a number of actions as described below.

S110: The process sets and stores information to be collected from a webpage for one or more items corresponding to a product.

The item information may be the default item information provided by the system, and may also be item information provided by the merchant. Item information may include: frequency of a client visit to the product's webpage, client order information, and so on.

In one embodiment, the process may provide an interface for a user to enter information to be collected from the webpage for one or more items corresponding to one or more products. The process may store the information for the one or more items corresponding to one or more products as entered by the user. The information may include: criteria for calculating value scores and respective weights of each of the one or more items. The process may calculate the value scores for the plurality of time sections based on the information entered by the user.

S120: In each time section, the process gathers data related to the item collected by the webpage.

When the merchant opens the function for achieving the optimal time for launch or withdrawing products, and after the system has retrieved the previously saved item information to be collected by the webpage, the process may trigger operational instructions on how to collect the data for each item. When the webpage has been visited and has satisfied the trigger conditions, the process will follow the operational instructions to finish collecting the corresponding item related data.

The item related data may be the item related data for any time period. For example, if it is desired to collect the item related data from 8 AM to 9 AM, the process may collect the item related data at 10 AM. Of course, it is possible to defer to the system's processing state to decide what time to collect the item data. For example, the system may be not busy from 1 AM to 5 AM, so it may be ideal to trigger the operational instructions to collect the item data at 2 AM, for example.

S130: The process calculates a respective value score for each time section. In the formula $sum(t)=q_1*m_1+q_2*m_2+\ldots+q_n*m_n$, each of $q_1, q_2\ q_n$ is the respective proportion of the respective item related data that needs to be collected by the webpage, each of $m_1, m_2, \ldots m_n$ is the respective number of occurrences of the respective item in the specific time section, and t in sum(t) is the value score for the time section.

The time section can be predefined, such as dividing one day into 24 time sections, with 1 hour for each time section. A time section can also be derived using steps described below.

A1: Determine the lowest and the highest time limits.

"Time limit" refers to the time limit for gathering item information. The lowest time limit and the highest time limit refer to the expected lowest time limit and highest time limit, respectively. The shorter the time limit, the more item collection the system needs to carry out and thus more system resources are used. Therefore, the lowest time limit needs to be predefined. When the time limit is high enough, the related item information collected cannot be used as the basis for future launch or withdrawal. Therefore, the lowest time limit and the highest time limit need to be predefined.

A2: Set the lowest time limit as the time limit.

A3: Assess if the number of client visit to the webpage has exceeded the predefined value in the time limit. If not, proceed to A4; otherwise the current time limit will be set as the duration of the time section;

A4: Increase the time limit. If the time limit is not higher than the highest time limit, then go to A3; otherwise exit. The length of time by which the time limit is to be increased can be predetermined.

This method can determine the corresponding time limit based on each merchant's specific situation.

The formula for calculating the value score can be provided by the system. The merchant can also set the item and the proportion it occupies.

S140: Based on a product's value score for each time section, the process determines the optimal time to launch or withdraw the product.

In normal situations, the time section with the highest value score may be considered as the optimal time for launching the product or similar products. The time section with the lowest value score may be considered as the optimal time for withdrawing the product or similar products.

S150: The process renders the product launch or withdrawal in the optimal time for product launch or withdrawal on the webpage.

When a new product is first launched, there is no product history value score from which to obtain the optimal time. Therefore, the process may first identify a product that is similar to the new product, determine the corresponding optimal time for product launch of the similar product, then render the product launch for the new product on the webpage in the corresponding optimal time for product launch of the similar product.

After a product has been launched once, and when it is to be launched again, the system can consider the product's previous launch time to trigger the product launch. The product's transaction volume can be determined Once the product's transaction volume has reached the predefined total for the product then the product may be withdrawn.

The above described process can be implemented in software or hardware. In one embodiment, the above described process can be implemented in the form of computer-executable instructions or code stored on one or more computer-readable storage media that, when executed by one or more processors of one or more computing devices, can cause the one or more computing devices to carry out the process. The one or more computer-readable storage media may be, for example, compact disc such as CD/ROM, flash memory, EEPROM, internal or external hard drive, USB drive, or any memory device that can store data or computer-executable instructions.

The present disclosure provides only a few sample embodiments. However, the present disclosure is not limited by these examples, and any changes proposed by persons in this technical field will be considered under the protection of the present disclosure.

What is claimed is:

1. An electronic commerce (e-commerce) system, comprising:
a server comprising one or more processors, one or more memory devices, and a plurality of units stored on the one or more memory devices and executable by the one or more processors, the plurality of units including:
a webpage information collection processing unit that collects a plurality of items corresponding to a first product on a webpage in each of a plurality of time sections, the plurality of items including information of one or more users who have visited the webpage in each time section and one or more orders of the first product placed in each time section;
a time section value score calculation unit that calculates a respective value score for each of the plurality of time sections by using an algorithm based on a respective number of occurrences of one or more items in the plurality of items in each time section and a respective weight of each of the one or more items;
a product launch/withdrawal optimal time determination unit that determines an optimal time to launch or withdraw the first product from the plurality of time sections based on the respective value score for each of the plurality of time sections; and
a product launch/withdrawal processing unit that renders a product launch or withdrawal of the first product in the optimal time.

2. The e-commerce system as recited in claim 1, wherein the server further comprises:
a time section determination unit that determines if a number of users who has visited the webpage has reached or exceeded a predefined value in a predefined time limit, the time section determination unit increasing the time limit to a new time limit when the number of users who has visited the webpage has not reached or exceeded the predefined value in the predefined time limit until the number of users who has visited the webpage has reached or exceeded the predefined value in the time limit, the time section determination unit setting the new time limit as a duration of the respective time section.

3. The e-commerce system as recited in claim 1, wherein the server further comprises:
a product launch/withdrawal reference processing unit that identifies a second product that is similar to the first product, determines a launch or withdrawal optimal time corresponding to the second product, and renders the product launch or withdrawal of the first product in the optimal time corresponding to the second product.

4. The e-commerce system as recited in claim 1, wherein the server further comprises:
a webpage information collection interactive interface that accepts data from a user to collect information of the one or more items corresponding to the first product.

5. The e-commerce system as recited in claim 1, further comprising a database, wherein the database comprises:
a product optimal time data storage unit that stores the optimal time for launch or withdrawal of the first product as determined by the product launch/withdrawal optimal time determination unit.

6. The e-commerce system as recited in claim 1, wherein the time section value score calculation unit calculates a respective value score for each of the plurality of time sections based on a respective number of occurrences of one or more items in each time section.

7. The e-commerce system as recited in claim 1, wherein the plurality of items further include a respective time of a respective user's visit to the webpage and a respective time of a respective order placed by the respective user.

8. The e-commerce system as recited in claim 1, wherein the time section value score calculation unit calculates a respective value score for each of the plurality of time sections by using a formula of $sum(t)=q_1*m_1+q_2*m_2+ \ldots +q_n*m_n$, wherein $q_1, q_2 \ldots q_n$ each represents a respective weight of a respective item in the plurality of items, $m_1, m_2 \ldots m_n$ each represents a respective number of occurrences of a respective item in the time section, and sum (t) represents the respective value score of the respective time section.

9. The e-commerce system as recited in claim 8, wherein when the formula is in the form of $sum(t)=q_1*m_1*q_2*m_2$, $m_1$ is a number of users who has visited the webpage in a time section t, $m_2$ is a number of orders placed in the time section t, $q_1$ is a weight for $m_1$ and $q_2$ is a weight for $m_2$.

10. The e-commerce system as recited in claim 1, further comprising a database, the database comprising a webpage collection and item storage unit that stores information of the plurality of items corresponding to the first product.

11. A method comprising:
collecting a plurality of items corresponding to a first product on a webpage in each time section of a plurality of time sections, the plurality of items including information of one or more users who have visited the webpage in each time section and one or more orders of the first product placed in each time section;
calculating a respective value score for each time section of the plurality of time sections by using an algorithm based on a respective number of occurrences of one or more items in the plurality of items in each time section and a respective weight of each of the one or more items;
determining an optimal time to launch or withdraw the first product based on the respective value score for each of the plurality of time sections; and
rendering launch or withdrawal of the first product in the optimal time,
wherein steps of collecting, calculating, and determining are performed by one or more processors configured with computer-executable instructions.

12. The method as recited in claim 10, further comprising:
identifying a second product that is similar to the first product;
determining a corresponding optimal time for product launch of the second product; and
rendering product launch for the first product on the webpage in the corresponding optimal time for product launch of the second product.

13. The method as recited in claim 10, further comprising:
providing an interface for a user to enter information to be collected from the webpage for one or more items corresponding to one or more products;
storing the information for the one or more items corresponding to one or more products as entered by the user, the information including criteria for calculating value scores and respective weights of each of the one or more items; and
calculating the value scores for the plurality of time sections based on the information entered by the user.

14. The method as recited in claim 11, wherein calculating a respective value score for each time section of the plurality of time sections comprises:

calculating a respective value score for each of the plurality of time sections by using a formula of $sum(t) = q_1 \cdot m_1 + q_2 \cdot m_2 + \ldots + q_n \cdot m_n$, wherein $q_1, q_2 \ldots q_n$ each represents a respective weight of a respective item in the plurality of items, $m_1, m_2 \ldots m_n$ each represents a respective number of occurrences of the respective item in the time section, and sum (t) represents the respective value score of the time section.

15. The method as recited in claim 11, further comprising storing information to be collected from the webpage for the one or more items corresponding to the first product, the storing comprises:

determining a lowest time limit and a highest time limit;
setting the lowest time limit as a default time limit;
assessing whether a number of client visit to the webpage has exceeded a predefined value in the default time limit;
increasing the default time limit when the number of client visit to the webpage has not exceeded the predefined value in the default time limit; and
setting the default time limit as a duration of the respective time section when the number of client visit to the webpage has exceeded the predefined value in the default time limit.

16. The method as recited in claim 11, wherein determining the optimal time comprises determining a time section with a highest value score to be the optimal time.

17. The method as recited in claim 11, further comprising storing information of the plurality of items corresponding to the first product.

18. A method comprising:

collecting one or more items corresponding to a first product on a webpage, the one or more items including information of one or more users who has visited the webpage;
determining a time section to calculate a respective value score for each of a plurality of time sections based on the collected one or more items, the determining including:
  determining if a number of users who has visited the webpage has reached or exceeded a predefined value in a predefined time limit;
  increasing the predefined time limit to a new time limit when the number of users who visited the webpage has not reached or exceeded the predefined value in the predefined time limit until the number of users who visited the webpage has reached or exceeded the predefined value in the time limit; and
  setting the new time limit as a duration of the time section;
calculating a respective value score for each time section of a plurality of time sections by using an algorithm based on a respective number of occurrences of the one or more items in each time section and a respective weight of each of the one or more items;
determining an optimal time to launch or withdraw the first product based on the respective value score for each of the plurality of time sections; and
rendering launch or withdrawal of the first product in the optimal time,
wherein steps of collecting, calculating, and determining are performed by one or more processors configured with computer-executable instructions.

19. The method as recited in claim 18, further comprising:
identifying a second product that is similar to the first product;
determining a corresponding optimal time for product launch of the second product; and
initially rendering product launch for the first product on the webpage in the corresponding optimal time for product launch of the second product.

20. The method as recited in claim 18, further comprising storing information of the one or more items corresponding to the first product.

* * * * *

UNITED STATES PATENT AND TRADEMARK OFFICE
CERTIFICATE OF CORRECTION

PATENT NO. : 8,429,087 B2  
APPLICATION NO. : 12/993139  
DATED : April 23, 2013  
INVENTOR(S) : Kaili Lv et al.

Page 1 of 1

It is certified that error appears in the above-identified patent and that said Letters Patent is hereby corrected as shown below:

On the Title Page, item (54), and in the specification, Col. 1, line 2, title, change "an" to
-- and --

Signed and Sealed this  
Twenty-fifth Day of June, 2013

Teresa Stanek Rea  
*Acting Director of the United States Patent and Trademark Office*